United States Patent [19]
Cebasek et al.

[11] Patent Number: 6,104,963
[45] Date of Patent: Aug. 15, 2000

[54] COMMUNICATION SYSTEM FOR DISTRIBUTED-OBJECT BUILDING AUTOMATION SYSTEM

[75] Inventors: Gregory B. Cebasek, New Berlin; Jeffrey J. Gloudeman, Franklin; Donald A. Gottschalk, Wauwatosa; David E. Rasmussen, Dousman, all of Wis.

[73] Assignee: Johnson Controls Technology Company, Plymouth, Mich.

[21] Appl. No.: 09/054,614

[22] Filed: Apr. 3, 1998

[51] Int. Cl.$^7$ ...................................................... G06F 19/42
[52] U.S. Cl. ................................. 700/86; 700/17; 700/83; 709/303
[58] Field of Search .................................. 700/1, 11, 15, 700/17, 83, 84, 85, 86, 87, 65, 89, 66–67, 225–228; 709/300, 301–305

[56] References Cited

U.S. PATENT DOCUMENTS

| | | | |
|---|---|---|---|
| 5,086,385 | 2/1992 | Launey et al. | 700/83 |
| 5,570,085 | 10/1996 | Bertsch | 340/825.07 |
| 5,572,438 | 11/1996 | Ehlers et al. | 364/492 |
| 5,579,221 | 11/1996 | Mun | 700/83 |
| 5,621,662 | 4/1997 | Humphries et al. | 702/57 |
| 5,706,191 | 1/1998 | Bassett et al. | 700/83 |
| 5,842,032 | 11/1998 | Bertsch | 712/1 |
| 5,875,395 | 8/1999 | Holmes | 455/420 |
| 5,898,875 | 4/1999 | Nakamura et al. | 395/712 |
| 5,938,757 | 8/1999 | Bertsch | 712/36 |

*Primary Examiner*—Joseph E. Palys
*Assistant Examiner*—Rijue Mai
*Attorney, Agent, or Firm*—Quarles & Brady LLP; George E. Haas

[57] ABSTRACT

A distributed computer-implemented building automation system for supporting applications that interact with building automation devices. The building automation system has a first device and a second device interconnected across a network channel. A common object superclass stored in a computer readable memory defines a plurality of common objects through instantiation such that the common objects have attributes for storing data and have methods for processing stored data. A source object residing on the first device performs a first control method such that a first attribute of the source object is changed. A destination object residing on the second device performs a second control method using the first attribute of the source object. A surrogate object connected between the source object and the destination object has a value for the first attribute and represents the source object on the second device. The second object has access to the value of the first attribute for performing the second method.

9 Claims, 11 Drawing Sheets

COMMUNICATION SYSTEM FOR DISTRIBUTED-OBJECT BUILDING AUTOMATION SYSTEM

BACKGROUND AND SUMMARY OF THE INVENTION

The present invention relates generally to networked building automation and control systems. More particularly, the invention relates to an object-oriented communication system employing surrogate objects to enable distributed-object components of the building automation system to interoperate.

The trend today in building automation systems is to move away from centralized to distributed control. Control functions that were once handled by a central controller are now being increasingly handled by distributed controllers connected to a computer network. Unlike conventional data processing networks, building automation system networks typically employ a large number of low cost microcontrollers, each dedicated to handling a different building automation function. Typically these controllers contain a microprocessor and the minimal complement of random access memory needed to perform the local task. Thus, although architecturally similar to a local area network in an office environment, the building automation network is considerably different when the capacity and function of the individual nodes are considered.

To illustrate the difference, a typical office environment computer or workstation has a large complement of random access memory and usually an even larger disk storage. Thus the office computer or work station is designed to run a variety of different application programs, often concurrently. In contrast, the "computer" at a typical node on a building automation network might comprise a far less powerful processor with minimal random access memory and no disk storage. The processor's function might be to control a single device, such as a damper in an air-handling unit.

Although the individual controllers at each node in a building automation network lack the computing power of an office workstation, they represent considerable computing power when considered collectively. The problem control engineers face today is how to harness that computing power. If these individual controllers could be integrated to work collectively they could perform sophisticated functions formerly possible only by using a powerful central controller. The difficulty has heretofore been how to integrate these controllers so that collectively they may perform sophisticated functions.

The present invention makes such integration possible through a powerful distributed-object communication system. The invention provides an architecture in which sophisticated building automation applications may be constructed from a plurality of comparatively simple standard building automation software objects. These objects, many of which are quite small and perform a singular purpose, communicate with one another through special surrogate objects provided by the communication system of the invention. The surrogate objects serve as the glue that binds the other standard objects into a complex building automation application and allow portions of the system to reside on physically separate servers. The surrogate objects allow objects to locate one another across a distributed network.

For a more complete understanding of the invention, its objects and advantages, reference may be had to the following specification and to the accompanying drawings.

BRIEF DESCRIPTION OF THE DRAWINGS

The accompanying drawings, which are incorporated in and constitute part of the specification, illustrate an embodiment of the present invention and together, with the description, serve to explain the principles of the invention. In the drawings, the same reference numeral indicates the same parts.

DESCRIPTION OF THE PREFERRED EMBODIMENT

The present invention provides a software system architecture that allows software engineers to more readily build modular, portable building automation applications. The software system of the invention is based on a distributed application component model that includes object-oriented constructs for performing a range of services used to construct more complex building automation applications. These services are performed by independent and decoupled objects that the application engineer may assemble in numerous ways to build complex building automation applications.

Aside from the flexibility and portability achieved by the object-oriented approach, the system architecture saves the engineer considerable time, by allowing new modules to be constructed without the need to re-compile the entire system. This greatly shortens the development time and simplifies the debugging process. Also, due to the top-to-bottom consistency of the distributed application component model, software modules can be deployed in a distributed way. Thus, the required functions and services needed in a complex system do not all need to reside in the same code or even on the same hardware components.

The invention achieves its modularity through a superclass design that enforces consistency. Desirably, all objects in the system inherit their properties from the superclass object specification.

The superclass object has a number of features that allow the system to achieve the above objectives. The superclass object specification defines properties of the class called views that enables user interface devices (person machine interface devices) to display information about the object. In the building automation industry this is not a trivial matter, for there is rarely much uniformity in the types of person machine interface devices found in the field, and the software engineer cannot assume that the interface device will have any knowledge of a particular object's display requirements.

The superclass object specification also defines a commands class that tells what operations a particular object is able to perform. Again, in the building automation industry, the software engineer cannot assume that the hardware and software systems in the field will have any understanding of what operations a given object may perform.

Thus the superclass object architecture defines a self-descriptive, metadata definition; and perhaps more importantly, a mechanism by which these metadata are communicated to other components of the system. In effect, the superclass object specification, from which all application components are derived by inheritance, carries with it the mechanism needed for other system components (and other application objects) to view the objects data and exercise the objects commands.

Figure 1:
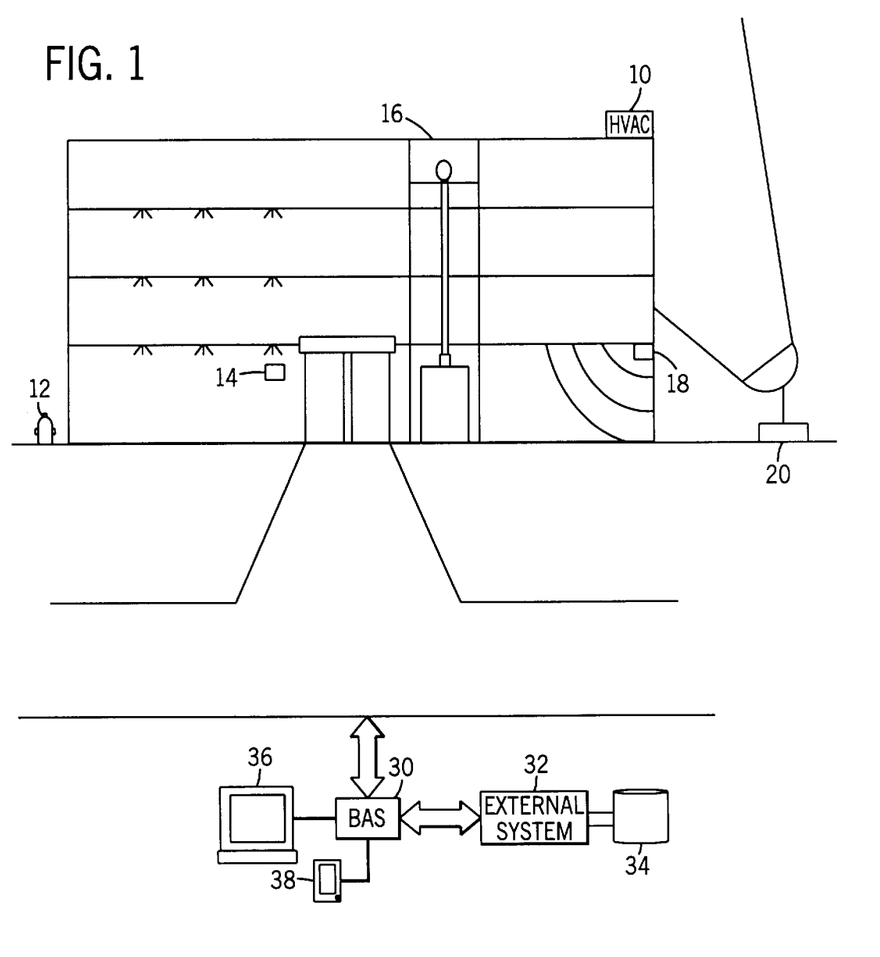
FIG. 1 is a diagrammatic view of a building environment, illustrating the building automation system of the invention in an exemplary application.

The building automation system of the invention provides a computer hardware and software architecture that supports powerful object-oriented system development. The building automation system can be used to monitor, collect data and control a multitude of different facilities management devices and applications. By way of illustration, FIG. 1 shows an exemplary facilities management application within a building that includes a heating and cooling system 10, fire alarms and sprinkler system 12, security system 14, elevator control system 16, intrusion alert system 18 and lighting control system 20. Although not explicitly illustrated, the exemplary facilities management application will typically also include such other building system services as sewer and water, waste management, landscape irrigation and maintenance, parking lot and sidewalk maintenance, and physical plant inventory control.

The building automation system 30 which uses the invention is designed to electronically communicate with the aforementioned building systems, either by direct hardwire connection or through wireless communication; or, by accessing information stored in data files maintained by other systems within the facility. As an example of the latter, the building might have an existing heating and air-conditioning (HVAC) system that must be integrated into the system of the present invention. Such an external system, illustrated at 32, can be readily connected to the building automated system 30 through the third party interface provided by the building automated system 30, as described more fully below. The external system 32 may include its own information storage component such as database 34.

The building automation system 30 also provides an Information Layer interface through which the human operator can interact with the building automation system through a variety of different user interfaces. To illustrate some of the possible interfaces, a monitor 36 and a personal digital assistant (PDA) 38 have been illustrated. These user interface devices can be connected to the building automation system by wire, wireless communication, local area network (LAN), wide area network (WAN), or through some other suitable communication lengths such as a telephone connection or the Internet.

Figure 2:
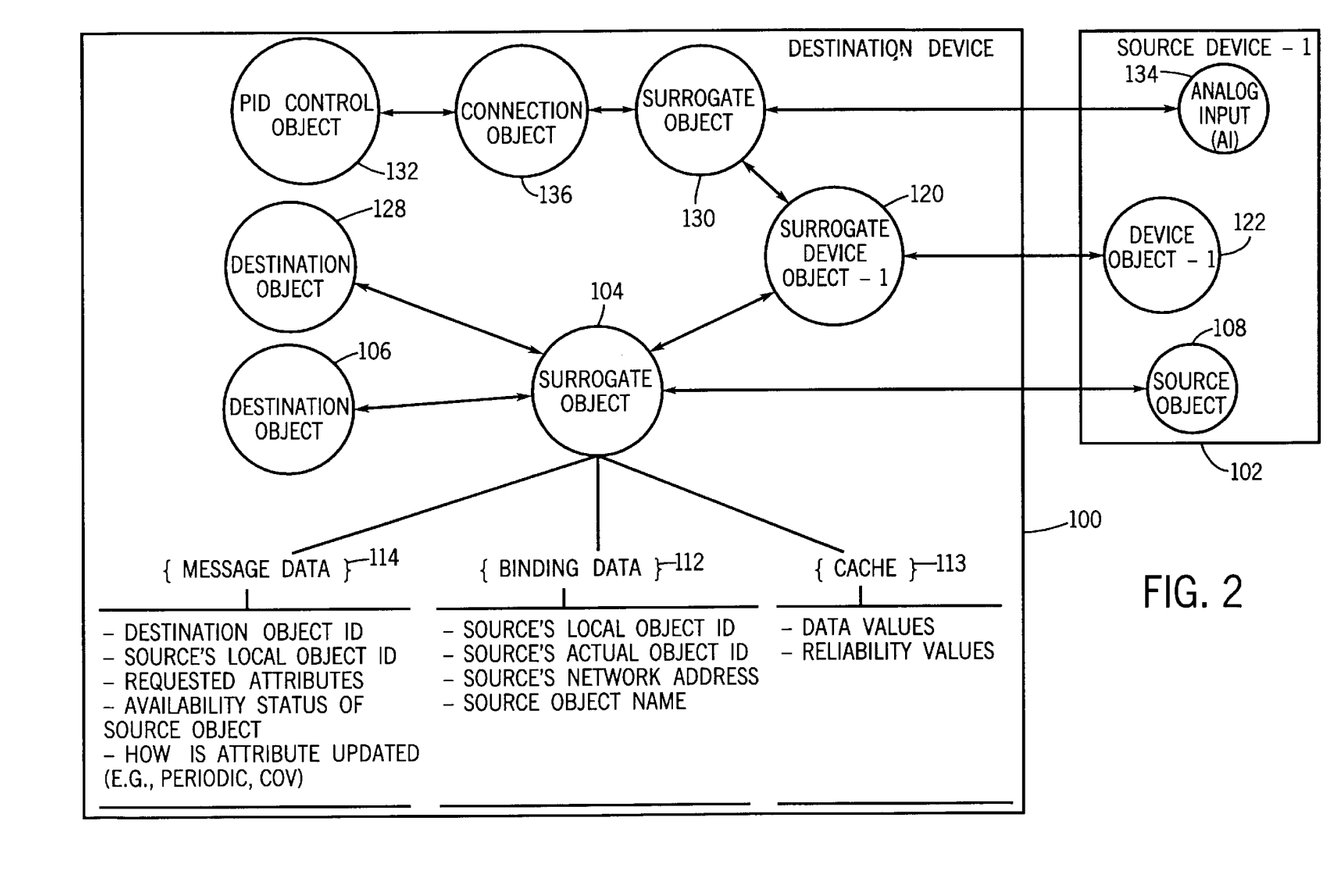
FIG. 2 is a data flow diagram showing the flow of data between a destination building automation device and a first source building automation device.

FIG. 2 depicts how objects on one building automation device within the building automation system 30 communicate with objects on another building automation device within the building automation system 30. In the example depicted by FIG. 2, objects on destination device 100 wish to acquire data from objects on a first source device 102. First source device 102 is viewed as the "source" of the data and destination device 100 is the "destination" of the information sent from the objects on first source device 102.

The present invention includes utilizing surrogate objects to manage the passing of information between system devices (e.g., destination device 100 and first source device 102). Surrogate objects, such as surrogate object 104, establish an asynchronous connection between devices. Surrogate object connections are created at run time as they are needed. The existence of a surrogate object is transparent to the system user.

When an object, such as destination object 106, opens a connection to an object using its name and the object does not exist on destination device 100, surrogate object 104 is created. Surrogate object 104 attempts to locate the object with the given name on other devices on the network. Surrogate object 104 attempts to find the remote object by broadcasting a BACnet "who has" message on the network.

In the example of FIG. 2, first source device 102 contains the source object 108 which corresponds to the name requested by surrogate object 104. First source device 102 sends back to surrogate object 104 a BACnet "I have" message which indicates to surrogate object 104 which device has the requested object and what its actual object ID is. Surrogate object 104 updates its binding data structure 112 with information from the "I have" message in order to link the surrogate object 104 with the source object 108 that it represents.

Accordingly, within binding data structure 112, the source's local object ID and name as supplied by the original message request from destination object 106 is linked with the information supplied by first source device 102 (i.e., the source's actual object ID and the source device network address). Once surrogate object 104 is bound, surrogate object 104 is ready to forward messages to the remote source object 108.

Surrogate object 104 sends a message to source object 108 in order to obtain the information as requested by destination object 106. These requests include read attribute messages, write attribute messages or command messages. The message information is stored in the message data structure 114.

Message data structure 114 contains the object ID of the destination object which is requesting the information; the local object ID of the source object (the local object ID is what is used by destination objects to refer to source objects which reside on different devices since the destination objects do not know the actual object ID of the source object); what attributes of the object should be sent to the destination object; and the availability status of the source object.

Moreover, surrogate object 104 stores the data values obtained from the remote source objects in cache 113. Cache 113 contains the obtained data value and a reliability value. The reliability value informs the destination objects of whether the data obtained from the remote device is reliable. An "unset" reliability flag for a particular data value indicates that the source object is no longer available for supplying "fresh" data to the surrogate object.

Within the preferred embodiment of the present invention, surrogate device objects are utilized to inform surrogate objects of the network addresses of the remote devices and whether the remote devices are still operational. On a particular device, there is one surrogate device object for each remote device that contains source objects that are supplying data to objects on the destination device. In the example of FIG. 2, first surrogate device object 120 receives network address information and heartbeat status information (i.e. whether the device is still operational) from first device object 122 which resides on first source device 102. First surrogate device object 120 supplies this information to surrogate object 104. Surrogate object 104 uses the network address data from first surrogate device object 120 in its binding data structure 112. Moreover, the availability information from first surrogate device object 120 is used to update message data structure 114.

When a response comes from the remote source object 108 that contains the requested information, surrogate object 104 stores the value in cache 113 and uses the information stored in message data structure 114 to route the response message back to destination object 106.

When surrogate object 104 receives a read attribute request, surrogate object 104 first attempts to handle the requests locally. An attribute value can be obtained locally if an object is currently signed up for the attribute in which case the value is obtained from cache 113. If the values of all the attributes in the read attribute request can be obtained locally, then no message is sent to any remote source object 108. Otherwise, the message is sent to the remote source object 108. This approach reduces the amount of traffic on the network and hence results in a more efficient building automation messaging network.

Surrogate object 104 can have one or more destination objects requesting information from the same remote source object. For example, destination object 128 may be requesting information about the same attributes or even different attributes from the same source object 108 as are being requested by destination object 106. If destination object 128 wishes to obtain information that is from a remote source object other than source object 108, then a different surrogate object than surrogate object 104 is used to act as the intermediary.

For example, surrogate object 130 acts as the intermediary for a destination object called PID control object 132. PID control object 132 uses, in this example, a temperature reading from a remote source object on first source device 102. The analog input object 134 on first source device 102 acts as the source of this information so that PID control object 132 can perform a "proportional-integral-derivative" control algorithm for the building automation system.

Since a different source object is used other than source object 108, surrogate object 130 is created. Moreover, in a preferred embodiment, a particular type of object called a connection object 136 is further utilized to manage the passing of information from the surrogate object 130 to the PID control object 132. Connection object 136 is created at link time (as opposed to a surrogate object which is created as needed at run time). Connection object 136 is utilized in the particular circumstance when PID control object 132 only wishes to have data from analog input object 134 whenever the value from analog input object 134 changes by a predetermined amount. Accordingly, whenever a predetermined change of value (COV) occurs, analog input object 134 sends the information to surrogate object 130 which passes the information onto connection object 136. Connection object 136 then supplies the data from analog input object 134 to PID control object 132 so that the scheduling operations can be performed.

If the source information for PID control object 132 were to be obtained from a remote device other than first source device 102, another surrogate device object will be created (if it is not already existing) in order to provide to the surrogate object 130 network address information and remote device availability status information.

Figure 3:
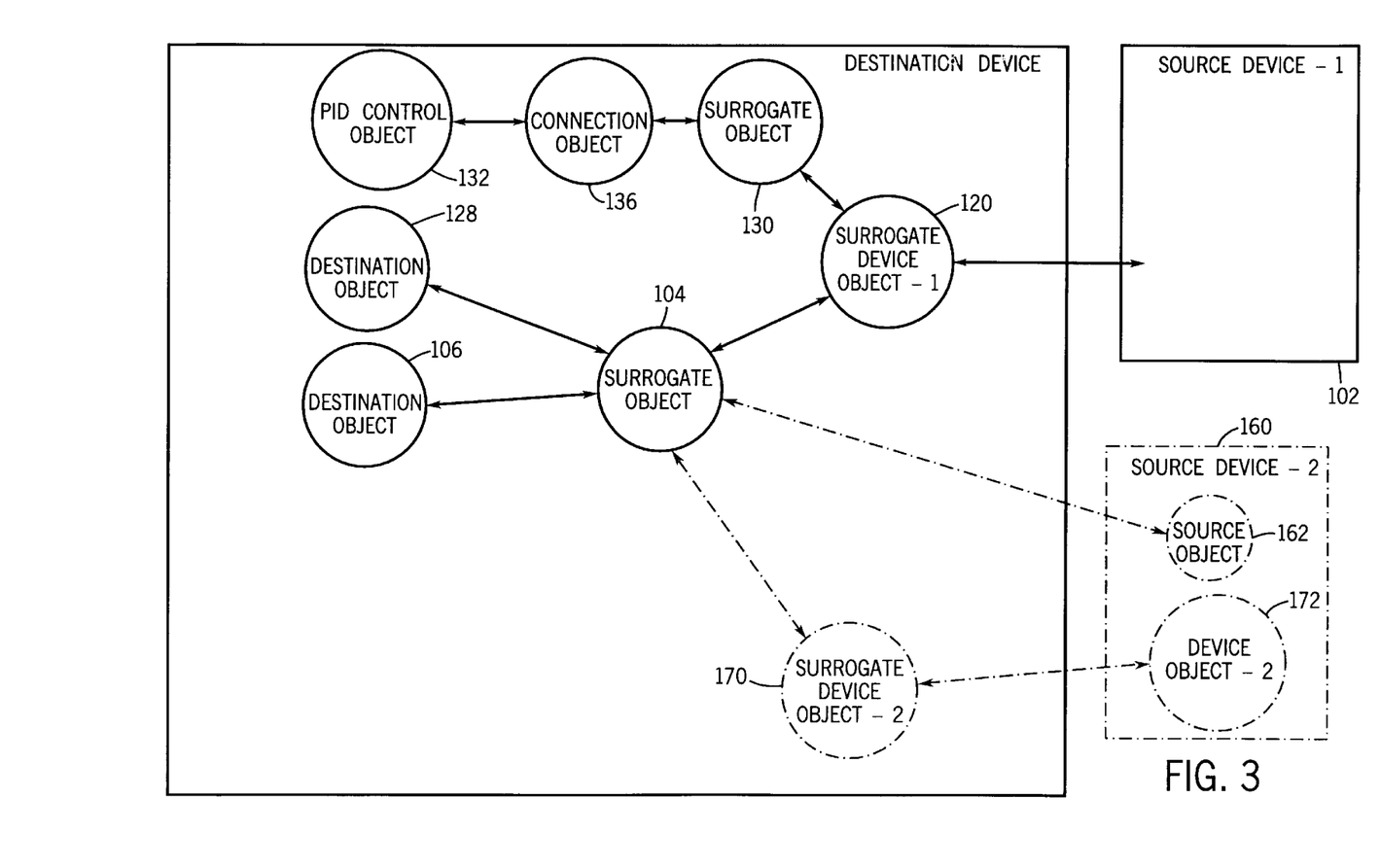
FIG. 3 is a data flow diagram showing the flow of data between a destination building automation device and a second source building automation device.

FIG. 3 illustrates the building automation operational scenario wherein a source device becomes inoperational and thus the surrogate objects which were receiving information from that inoperational device search for other objects on the building operation network that can supply the information. When first surrogate device object 120 detects that first source device 102 is no longer capable of communication, first surrogate device object 120 notifies surrogate object 104 of this change in status to first source device 102. Surrogate object 104 updates the appropriate data structure with this recent availability status data.

Surrogate object 104 broadcasts a BACnet "who has" across the network to determine whether another remote device might have a similarly named object to supply the data formerly supplied by the object on first source device 102. In this example, a second source device 160, a BACnet "I have" message to notify surrogate object 104 that a source object 162 exists on second source device 160 that has the requested data. A second surrogate device object 170 notifies surrogate object 104 of the network address of the second source device 160 and notifies surrogate object 104 if second source device 160 becomes inoperational. Second surrogate device object 170 communicates with second device object 172 which is on second source device 160 for this information.

Surrogate object 104 then continues to operate substantially as before in providing information to destination objects 106 and 128. In one embodiment of the present invention, surrogate object 104 continues to receive information from second source device 160 even if it is notified by first surrogate device object 120 that first source device 102 has become operational again. In an alternative embodiment of the present invention, surrogate object 104 switches back to receiving information from first source device 102 upon notification from first surrogate device object 120 that the first source device 102 has become operational again. This feature of finding alternative sources of information on a building automation network further enhances the robustness of the overall building automation control network system.

Figure 4:
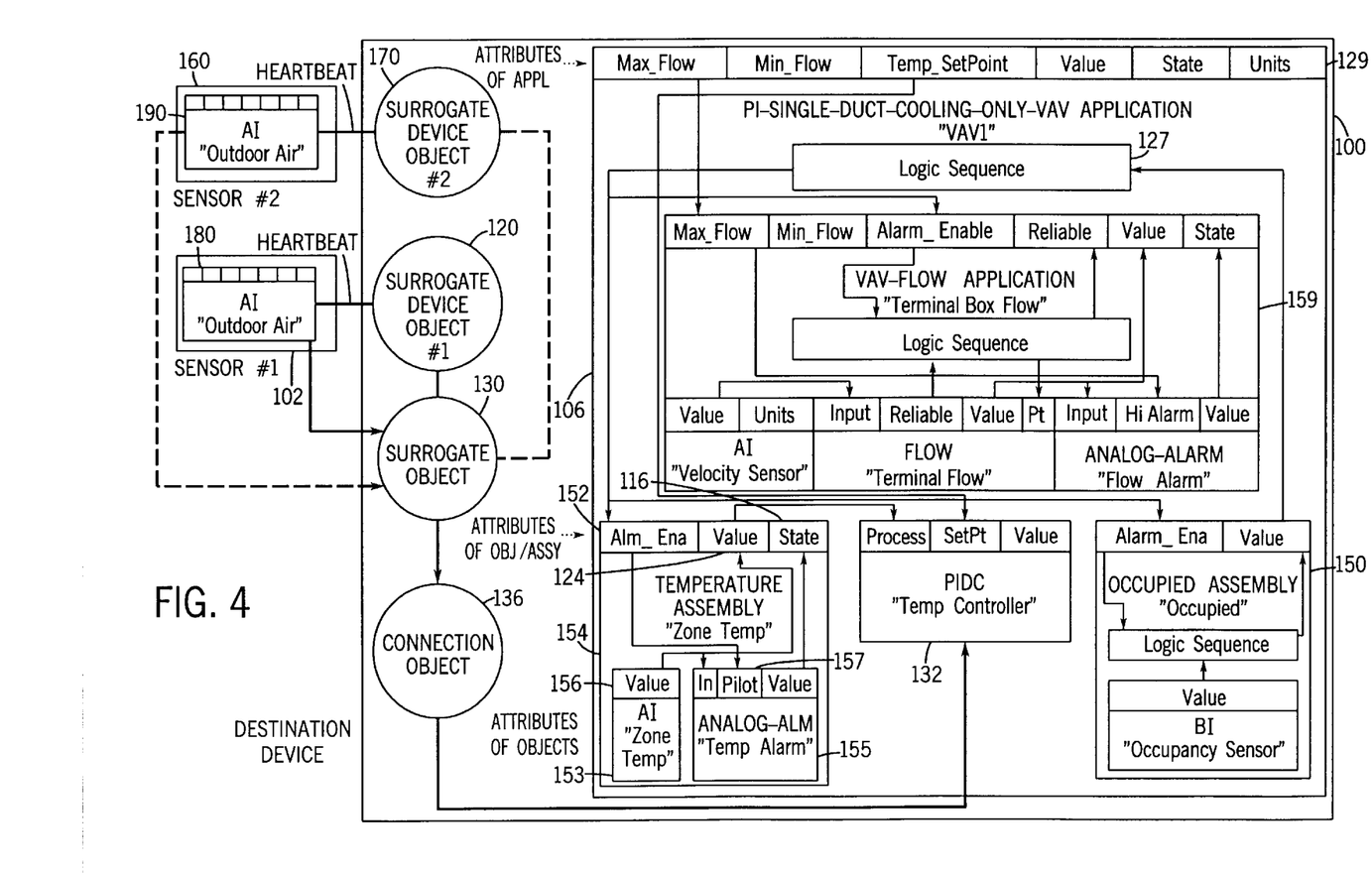
FIG. 4 is an object-oriented diagram illustrating the data and methods involved in an example of two controllers interacting with a duct space cooling application.

FIG. 4 is a detailed example depicting the use of the surrogate objects within a building automation control system. In this example, source devices 102 and 160 are sensors located on the outside of a building which contain objects for monitoring the temperature of the outdoor air. Destination device 100 is a variable air volume controller which uses the temperature of the outdoor air in order to control a single duct cooling VAV (variable air volume) apparatus. VAV controller 100 includes a VAV control application object 106 for performing that control.

This figure illustrates how objects (which are combined and interconnected to construct a building automation application) can communicate across devices. For example, an Analog Input standard object 153 for detecting a zone temperature is combined with an Analog Alarm standard object 155 to form a Temperature assembly object 154. The VAV application 106 sets the Alarm Enabled attribute 152 of Temperature assembly object 154 which in turn is sets the Pilot attribute 157 associated with Analog Alarm object 155.

The Temperature value attribute 156 of Analog Input object 153 is interconnected as an input to Analog Alarm object 155 and Temperature assembly object 154. When the zone temperature value exceeds a threshold value established by Analog Alarm object 155, a State attribute 116 of Temperature assembly object 154 is set by Analog Alarm object 155. Temperature value attribute 124 and State attribute 116 of Temperature assembly object 154 can then be interconnected to other standard objects, assembly objects or application objects that comprise VAV application 106.

Temperature assembly object 154 is one of the standard software components comprising VAV application 106. A PID standard object 132, an Occupied assembly object 150 and a nested VAV Flow application object 159 are also embedded into VAV application 106. Like Temperature assembly 154, Occupied assembly 150 and VAV Flow application 159 are constructed from standard objects consisting of a Binary Input object, and an Analog Input object, a Flow object and an Analog Alarm object, respectively. In addition, to these standard objects, each of these assembly objects are also designed to include attributes and a logic sequence.

After creating each of these standard software components, a building automation application engineer can then define an attribute structure 129 and a logic sequence 127 that interconnects/interacts with each of these individual software components to provide VAV application 106. Typical applications, including rooftop unit control, air handling unit control, chiller plant control and fan coil control, would also be constructed from a set of standard objects in this manner for use in the building automation system of the present invention.

For communication across devices, surrogate object 130 provides the outdoor air temperature value from the outdoor air space AI (analog input) object 180 that is located on first sensor 102 to PID object 132 via connection 136. First surrogate device object 120 monitors the availability status of first sensor 102 and notifies surrogate object 130 of any changes to that status.

If surrogate object 130 is notified by first surrogate device object 120 that first sensor 102 is inoperational, surrogate object 130 then attempts to locate another object on the network which can supply the same type of information in the manner described above. In this example, second sensor 160 indicates to surrogate object 130 that outdoor air AI object 190 exists on its device and can supply the temperature value so that VAV control object 106 can continue its normal control operations. A second surrogate device object 170 is created (if it is not already existing) to monitor the availability status of second sensor 160.

Figure 5:
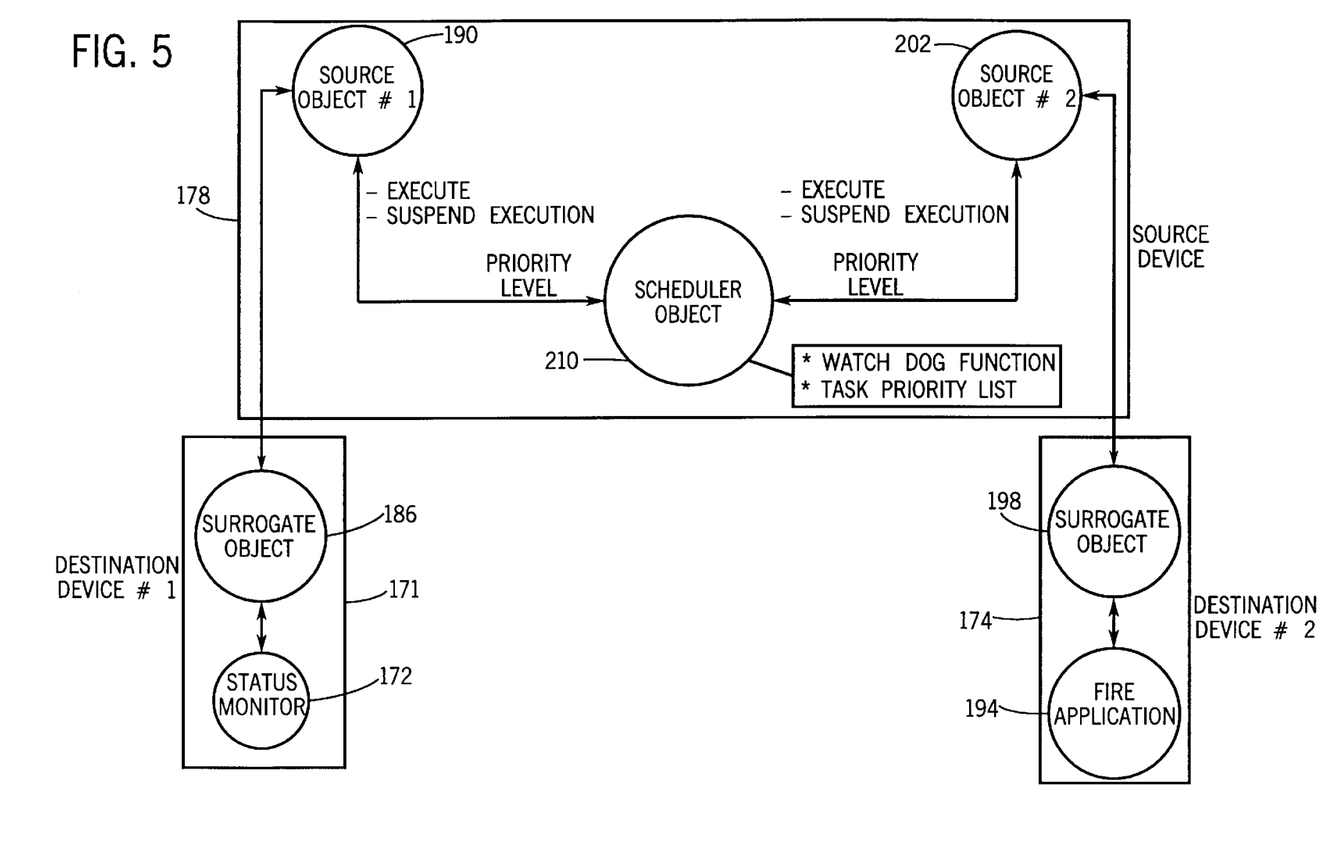
FIG. 5 is a data flow diagram illustrating the flow of data used in handling execution of multiple objects.

FIG. 5 depicts the data flow involved in scheduling multiple source objects on one device. In the example of FIG. 5, destination devices 171 and 174 both wish to interface with objects on the same source device 178. On first destination device 171, a status monitor object 182 uses surrogate object 186 in the manner described above in order to have first source object 190 perform a task (e.g., provide air flow information for a particular building automation control zone). On second device 174, a fire application object 194 uses surrogate object 198 in order to determine the temperature of a building automation control zone via second source object 202 in order to detect whether an abnormal condition exists.

Status monitor object 182 and fire application object 194 each send their messages at a predetermined priority level. In the preferred embodiment, the priority level of a message from a fire application module 194 is at a higher priority level than those messages which are generated from a status monitor object 182 during its normal operations.

Source device 178 contains a scheduler object 210 to determine which objects are to be executed on source device 178 based upon the priority levels associated with the messages to the source objects. Accordingly, scheduler object 210 maintains a task priority list in order to instruct a particular object to execute or to suspend execution. For example, if first source object 190 were executing and the higher priority message from the fire application object 194 arrived at source device 178, scheduler object 210 would instruct first source object 190 to suspend execution so that second source object 202 can execute in order to satisfy the request from fire application object 194.

In the preferred embodiment, scheduler object 210 also includes a "watchdog" timer function that will request an object to suspend execution that is taking a predetermined excessive amount of time to execute. An object type that may take a long time to execute is responsible to respond to the suspend request from the scheduler object 210. In an alternate embodiment, the source object itself has the logic within itself to police its own execution time. For example, the source object can keep track of the number of instructions executed in order to track how long it has been running.

Objects are scheduled to execute by the scheduler object based upon the priority of the execute request. Higher priority requests will always execute before lower priority requests. Multiple requests at the same priority will be handled in a first-come first-serve fashion (i.e., FIFO sequence). An object that suspends execution for any reason will move to the end of the list at the priority at which it was executing.

Figure 6:
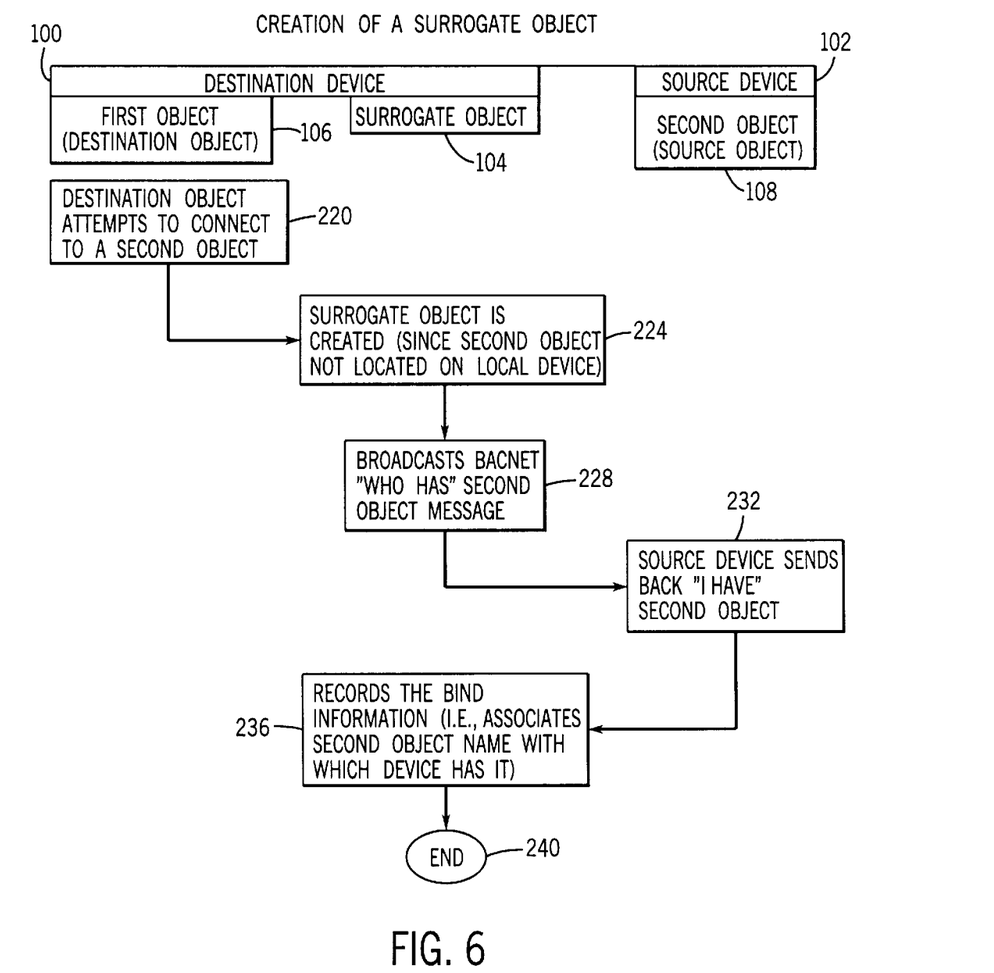
FIG. 6 is a flow chart depicting the operational steps involved in the creation of a surrogate object.

FIG. 6 is a flow chart depicting the operational steps for the creation of a surrogate object. The flow chart has been partitioned to represent which operations the first object 106 and surrogate object 104 are performing on the destination device 100 versus the operations which are being performed by second object 108 on source device 102.

At process block 220, the destination object attempts to connect to a second object in order to obtain information. If the object cannot be located on the destination device, a surrogate object is created at process block 224. The surrogate object broadcasts the BACnet "who has the second object" message across the network. The source device sends back a BACnet "I have the second object" message to the surrogate object at process block 232. The surrogate object at process block 236 records the bind information (i.e., the location information and identification information for the second object name). Processing terminates at end block 240.

Figure 7:
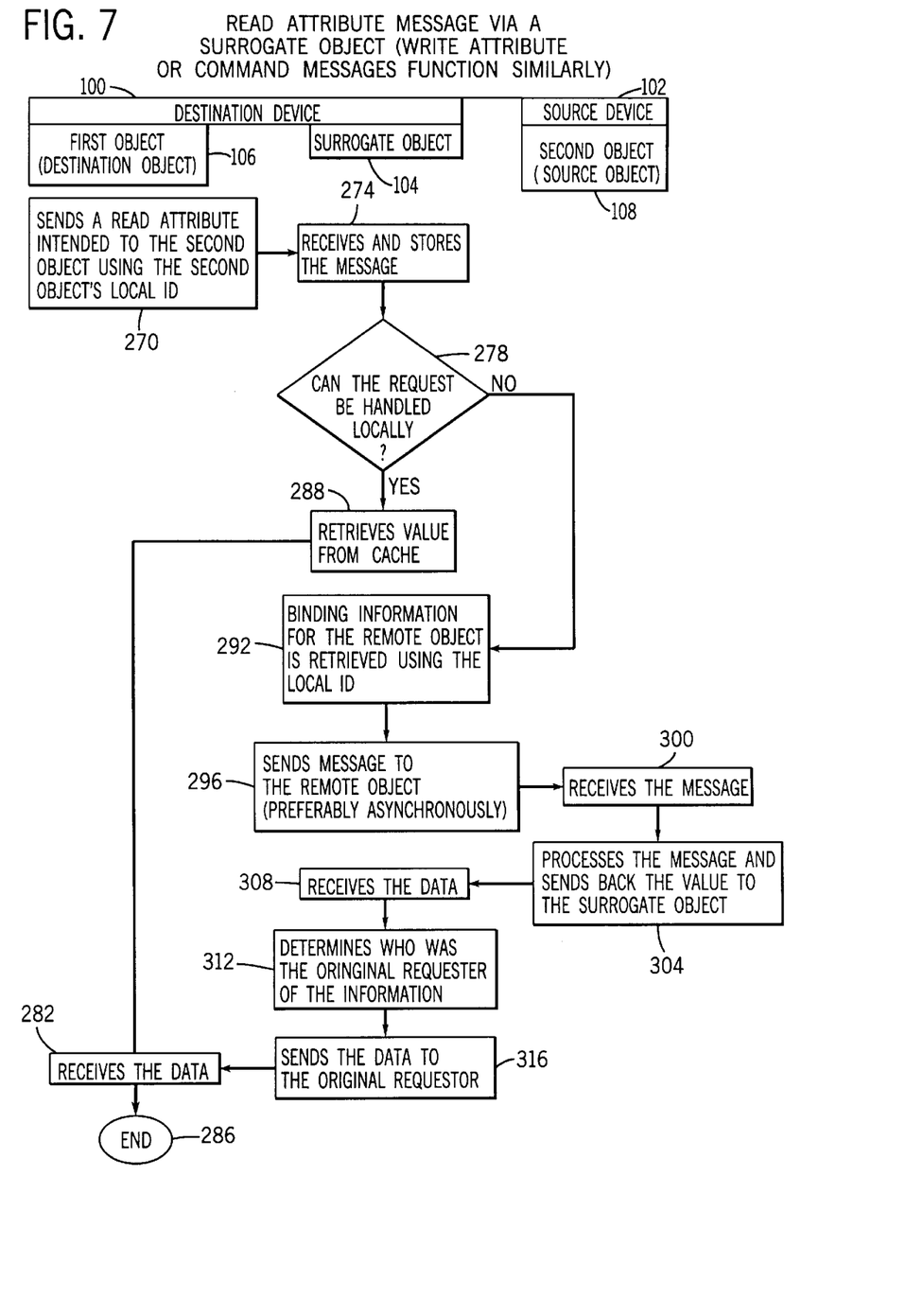
FIG. 7 is a flow chart depicting the operational steps involved in processing a read attribute message via a surrogate object.

FIG. 7 is a flow chart depicting the operational steps involved in processing a read attribute message via a surrogate object. At process block 270, a first object sends a read attribute message intended for a second object using the second object's local ID. The surrogate object at process block 274 receives and stores the message and determines at decision block 278 whether the request from the first object can be handled locally. If the request can be handled locally, then surrogate object retrieves the data from cache at process block 288 and sends the data to the first object which receives it at process block 282 before the processing of this read attribute message terminates at block 286.

If the surrogate object cannot handle the requests locally, then processing continues at process block 292 wherein the surrogate object utilizes binding information in order to retrieve data from a remote second object. The surrogate object sends the message to the remote second object at process block 296.

The second object receives the message at process block 300 and processes the message and sends back the value to the surrogate object at process block 304. At process block 308, the surrogate object receives the data and determines who the original requestor of the information was at process block 312 based upon its data structures. The surrogate object at process block 316 sends the data back to the original requestor which receives the data at process block 282. Processing for the read attribute message terminates at end block 286.

Figure 8A:
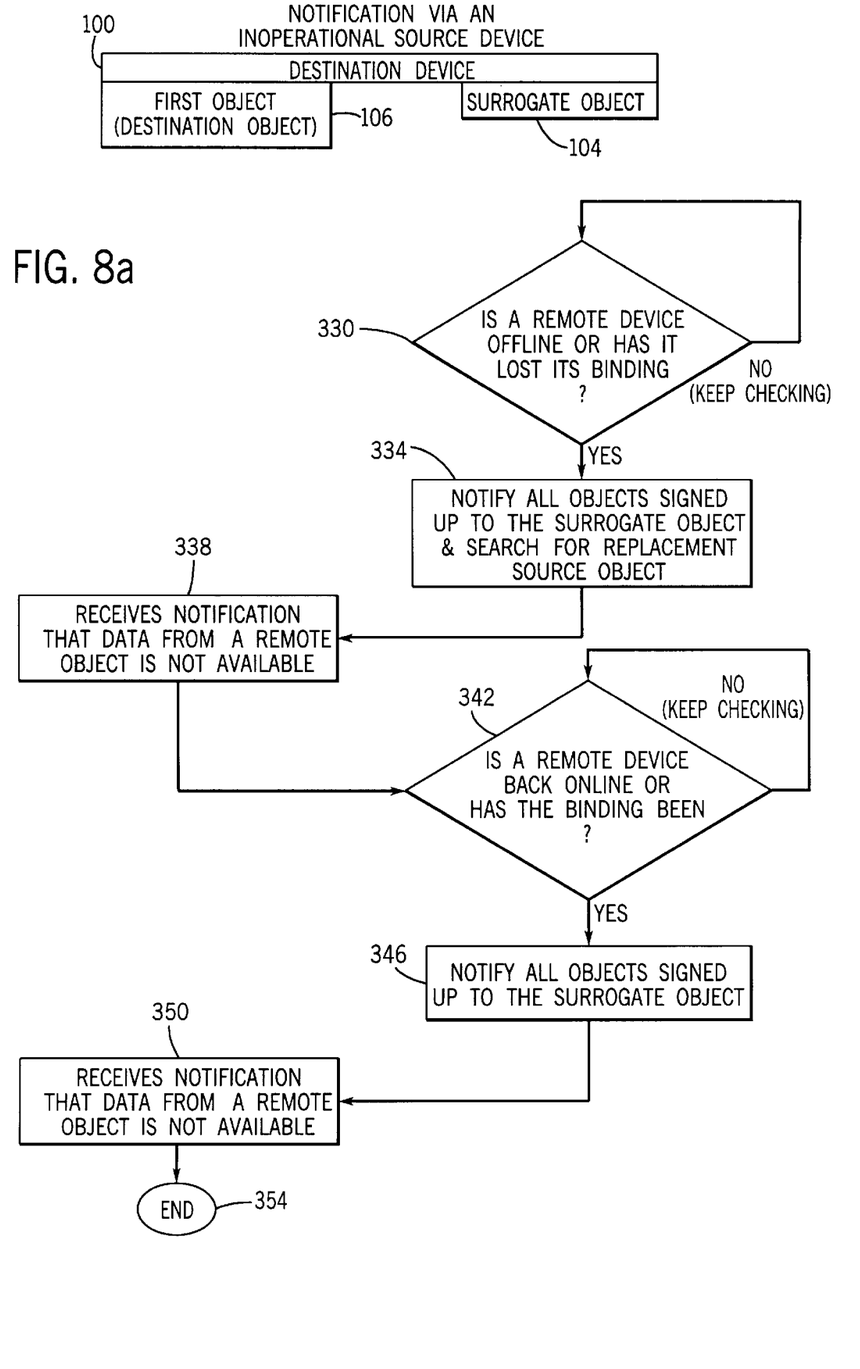
FIGS. 8a–8c are flow charts depicting the operational steps related to processing when a source device becomes inoperational.

FIG. 8a is flow chart depicting the operational steps involved in notification of an inoperational source device. This processing is used since an object requesting a sign-up with a particular surrogate object relies on the fact that the remote source object containing the attribute of interest will report a change back to the requesting object as the change occurs or substantially soon thereafter. However, if the device containing the source object goes off-line with respect to the requester, the change report from the source object may never occur.

In order to monitor this, the surrogate object at process block 330 utilizes information from the surrogate device object in order to determine whether a remote device has become off-line. Moreover, the surrogate object also determines whether it has lost its binding with respect to the source object. The surrogate object at a fixed interval checks for this particular situation and when it does occur, the surrogate object at process block 334 notifies all the objects that are signed up to the surrogate object that the remote source object is no longer available. In the preferred embodiment, this notification by the surrogate object is done by changing the reliability attribute of the source object that is contained in the message data structure of the surrogate object. Also, the surrogate object attempts to locate another object on the network which can supply information similar to the inoperational source object.

While the surrogate object searches, the destination object may still use a previously reliable data value or may choose to suspend operations until a reliable value has been obtained by the surrogate object. The surrogate object continually checks for when the remote device is back on-line or if the binding has been regained.

If it has as determined by decision block 342, then the surrogate object notifies all the objects that were signed up to the surrogate object that the data from the remote source object is available again. In the preferred embodiment, the surrogate object does the notification by sending data values with their reliability flags set. The destination object at process block 350 is aware of this event by the reliability value of the attribute. Processing terminates at end block 354.

Figure 8B:
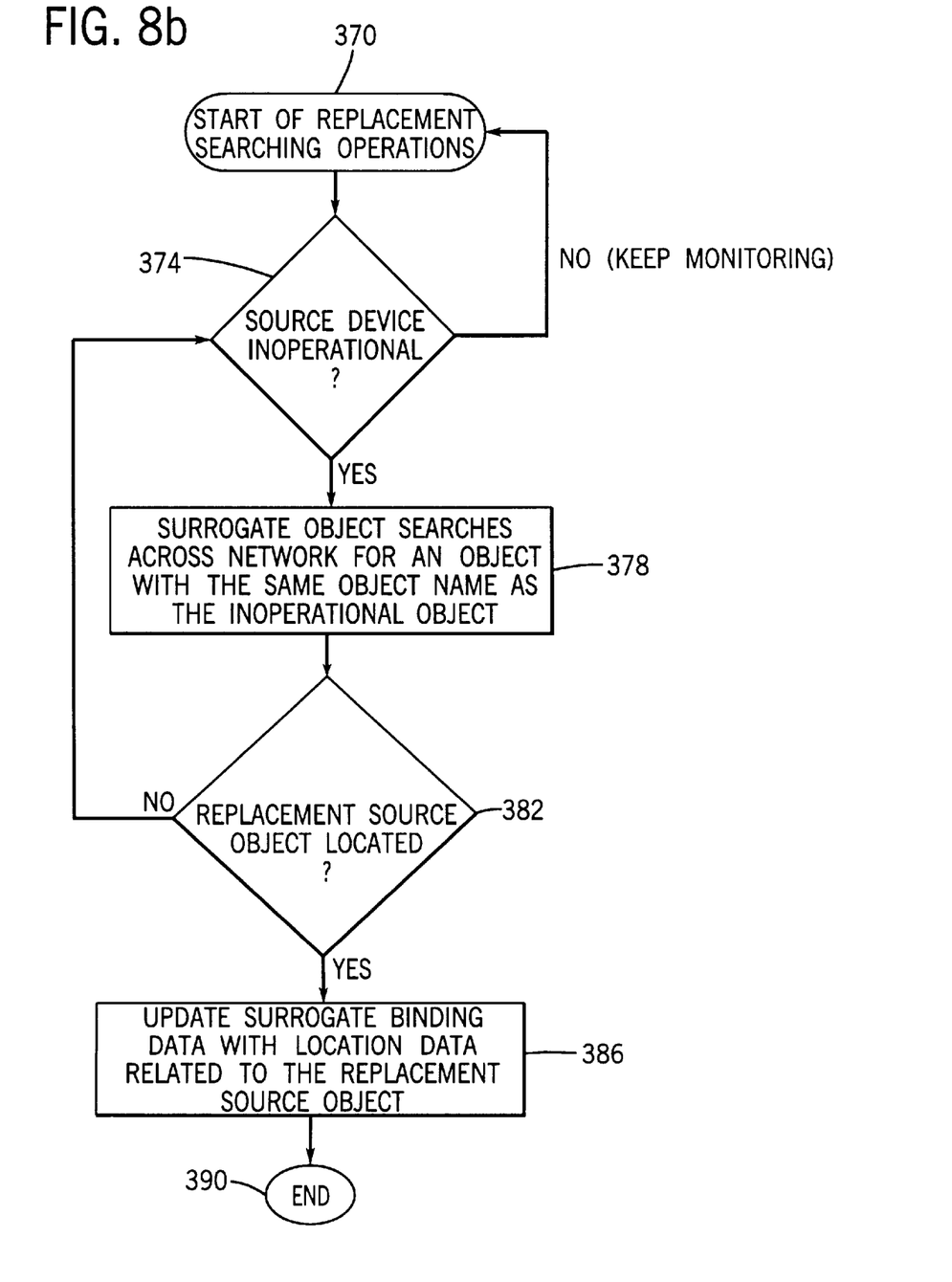

FIG. 8b depicts the operational steps for the surrogate object searching for a replacement object which will provide the processing and information of the object that is no longer operational. Start indication block 370 indicates that decision block 374 is be executed. If decision block 374 determines that the source device which contains a source object which a surrogate object needs is no longer operational, then process block 378 is executed.

At process block 378, the surrogate object inquires through the BACnet "who has" message if any other devices exist on the network which have the same name as the inoperational source object to which the surrogate object was originally connected. If a replacement source object is not located, then decision block 374 is reexecuted.

If a replacement source object has been located via a second source device sending a BACnet "I have" message, then process block 382 is executed. At process block 382, the surrogate object updates its binding data structure with the location data (e.g., network address, replacement source object's identifier) related to the replacement source object. Processing terminates at end block 386.

Figure 8C:
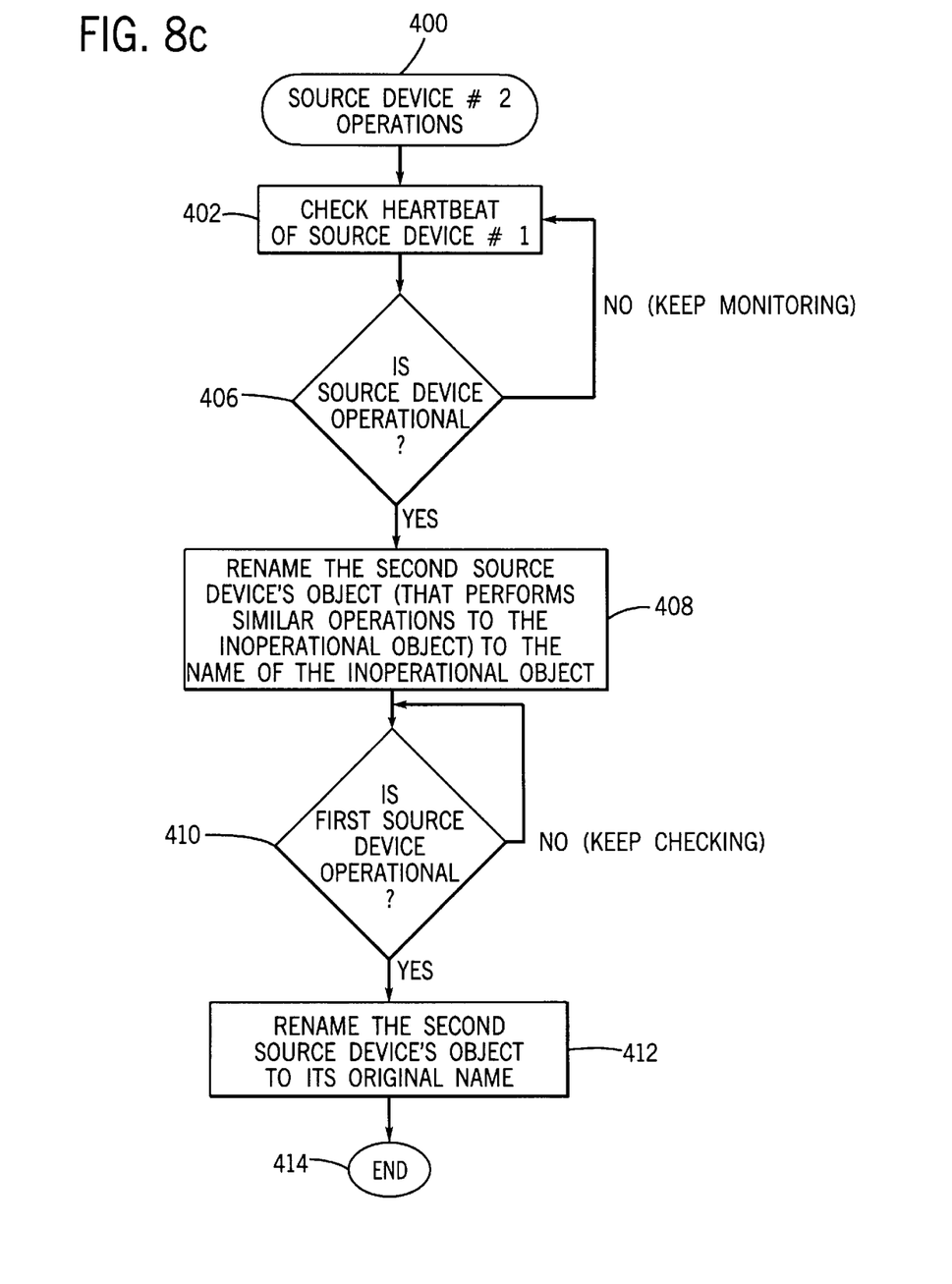

FIG. 8c depicts the operational steps which a second source device performs when a first source device which was supplying information to a destination device becomes inoperational. In this example, the second source device is similar in functionality to the first source device and thus has objects similar in functionality to the first source device.

Start indication block 400 indicates that process block 402 is to be executed. At process block 402, the second source device monitors the health status of the first source device. If the second source device determines at decision block 406 that the first source device is inoperational, then process block 408 is executed.

At process block 408, either automatically or at the behest of the user, the second source device renames the object (which is performing a function similar to the inoperational object on the first source device). With the renaming performed, a surrogate object (such as the surrogate object discussed in FIG. 8b) can now locate a replacement object.

If the second source device at decision block 410 determines that the first source device is operational again, then processing continues at process block 412 wherein the second source device renames the second source device's object back to its original name. Processing terminates at end block 414.

Figure 9:
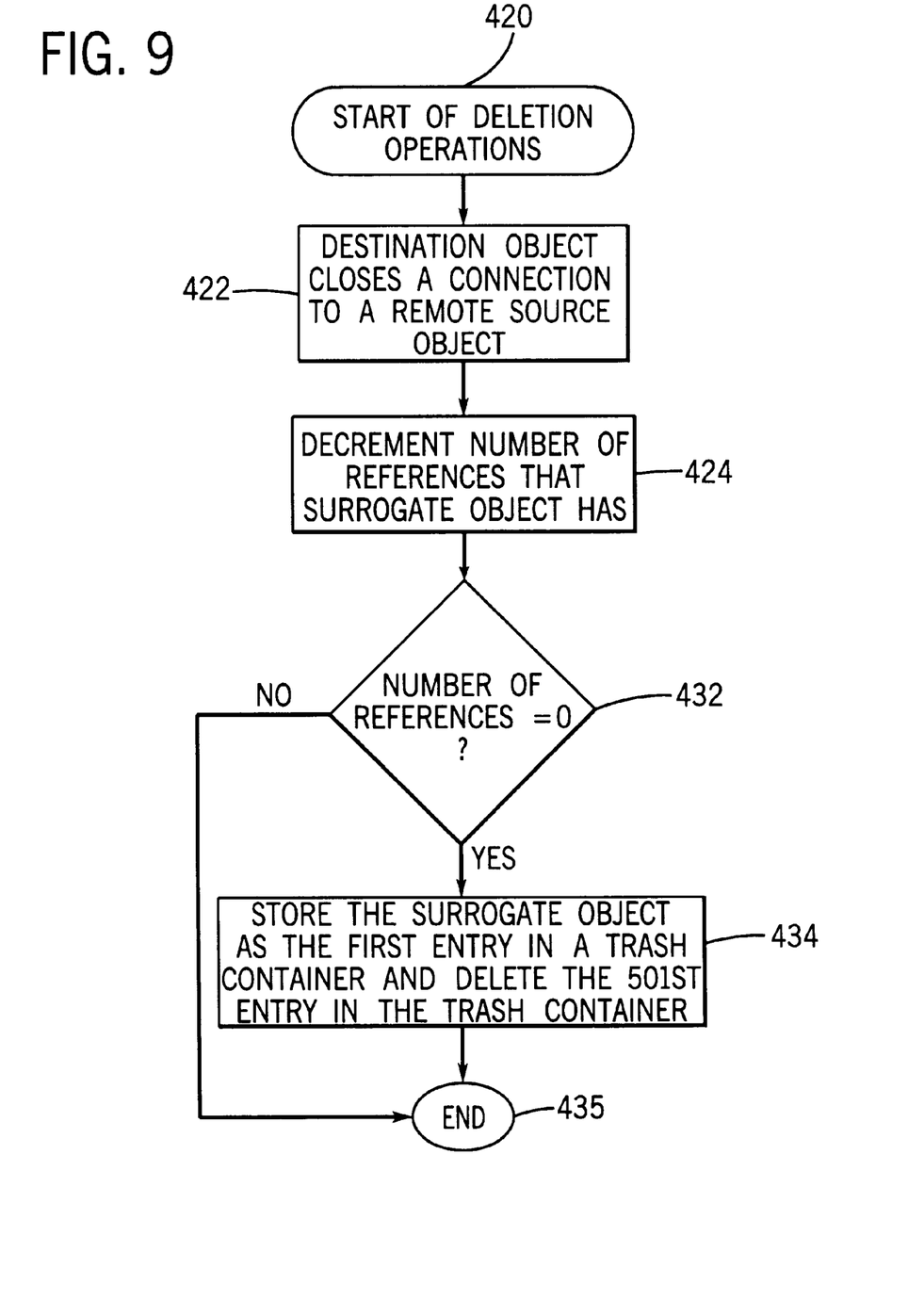
FIG. 9 is a flow chart depicting the operational steps involved in deleting a surrogate object.

FIG. 9 is a flow chart depicting the operational steps in deleting a surrogate object. Start block 420 indicates that process block 422 is to be executed first. At process block 422, a destination object closes a connection through a surrogate object to a remote source object. At process block 424, the number of "references" that the surrogate object has is decremented since it has lost one of its destination objects at process block 422. Within the present invention, the term "references" indicates the destination objects for which a surrogate object operates as an intermediary in obtaining data from a remote source object. If the number of references is not zero as determined by decision block 432, then processing terminates at end block 435.

If there are no references remaining for the surrogate as determined by decision block 432, then process block 434 is executed. At process block 434, the surrogate object is stored as the first entry in a trash container and the "oldest" entry in the trash container is deleted. In the preferred embodiment, the present invention retains the most recent five hundred stored surrogate objects.

The embodiments which have been set forth above were for the purpose of illustration and were not intended to limit the invention. It will be appreciated by those skilled in the art that various changes and modifications may be made to the embodiments discussed in this specification without departing from the spirit and scope of the invention as defined by the appended claims.

We claim:

1. A distributed computer-implemented building automation system for supporting applications that interact with building automation devices, having a first device and a second device interconnected across a network channel, comprising:

a common object superclass stored in a computer readable memory that defines a plurality of common objects through instantiation such that said common objects have attributes for storing data and have methods for processing stored data;

a source object residing on the first device for performing a first control method such that a first attribute of said source object is changed;

a destination object residing on the second device for performing a second control method using said first attribute of said source object; and a surrogate object connected between said source object and said destination object, having a value for said first attribute and representing said source object on the second device, whereby said second object has access to said value of said first attribute for performing said second method.

2. The system of claim 1 wherein said surrogate object includes a binding data structure that stores information for linking said source and destination objects.

3. The system of claim 1 wherein said destination object has control logic to assess the reliability of said first attribute.

4. The system of claim 1 wherein said surrogate object includes a cache data structure for storing said value for said first attribute in association with a reliability flag used by said destination object to interpret said value.

5. The system of claim 1 wherein said source object includes a change of value mechanism that sends a message to said destination object through said surrogate object when said first attribute changes by a predetermined amount.

6. The system of claim 1 further comprising a second destination object residing on said first device; and a connection object residing on said first device for passing said first attribute to said second destination object.

7. The system of claim 6 wherein said second destination object performs a third control method, wherein said source object and said second destination object operate asynchronously and wherein said connection object stores said first attribute for reading by said second destination object at a time dictated by said third control method.

8. The system of claim 1 wherein said source object and said destination object operate asynchronously and wherein said surrogate object stores said first attribute for reading by said destination object at a time dictated by said second control method.

9. The system of claim 1 wherein said second device includes mechanism for sending a heartbeat status message and wherein said surrogate object receives said heartbeat status message and uses said heartbeat status message to notify said destination object if the source object is no longer communicating.

* * * * *